W. H. NIEMEYER.
STAMP RACK.
APPLICATION FILED JAN. 7, 1918.

1,361,539.

Patented Dec. 7, 1920.

Inventor:
William H. Niemeyer
by John W. Clarley,
Atty.

W. H. NIEMEYER.
STAMP RACK.
APPLICATION FILED JAN. 7, 1918.

1,361,539.

Patented Dec. 7, 1920.
5 SHEETS—SHEET 2.

Inventor:
William H. Niemeyer
by John W. Harley
Atty.

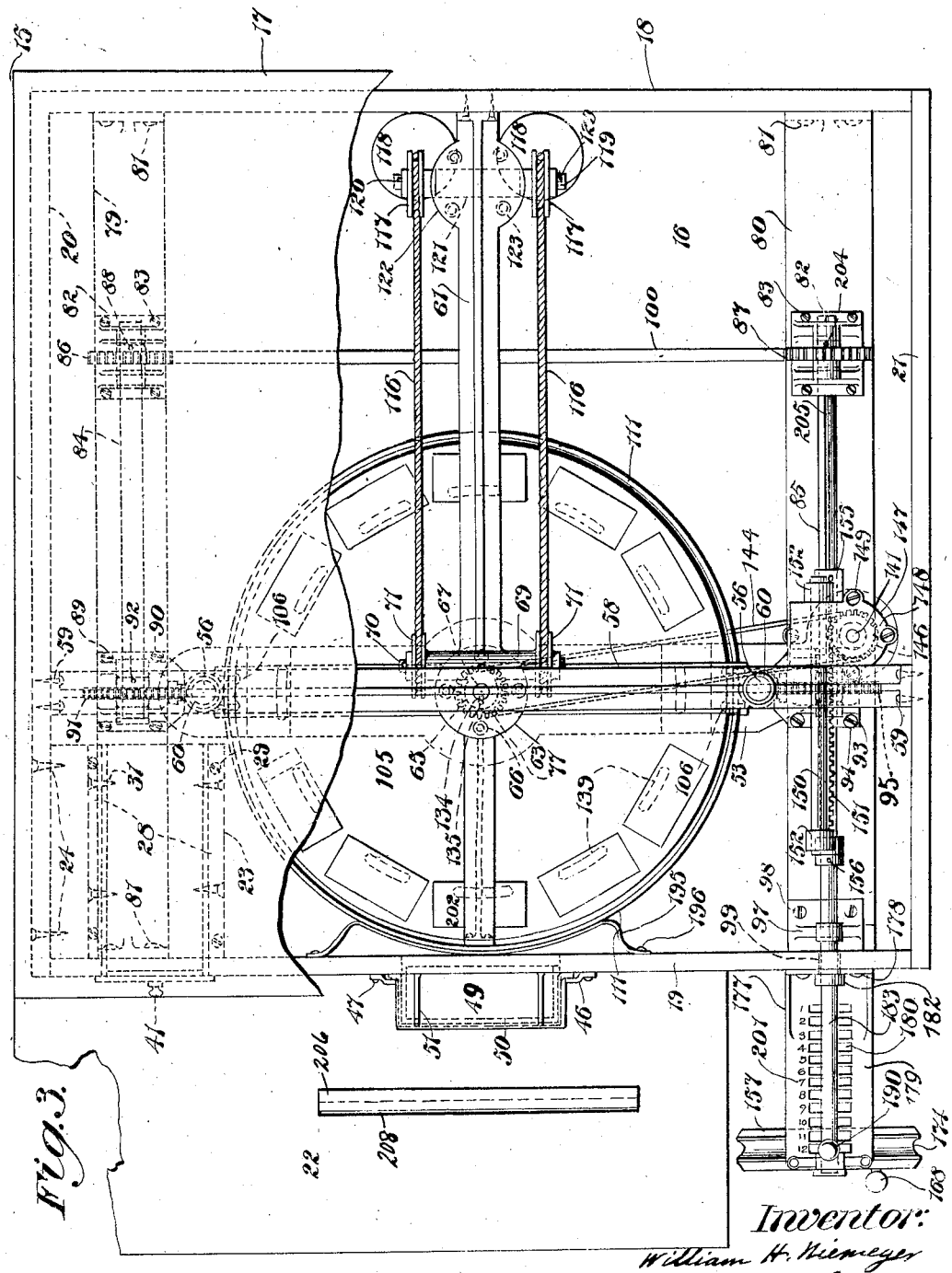

W. H. NIEMEYER.
STAMP RACK.
APPLICATION FILED JAN. 7, 1918.
1,361,539.
Patented Dec. 7, 1920.
5 SHEETS—SHEET 4.
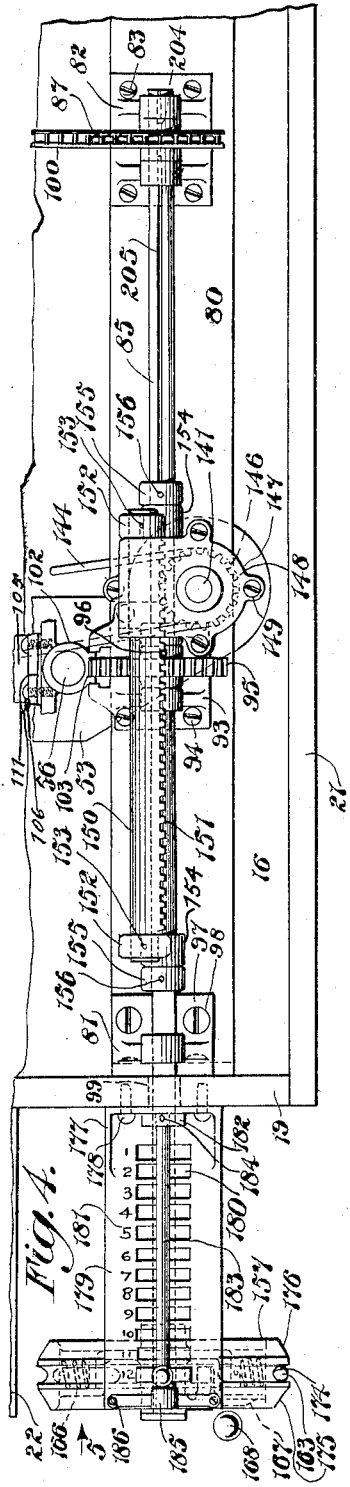
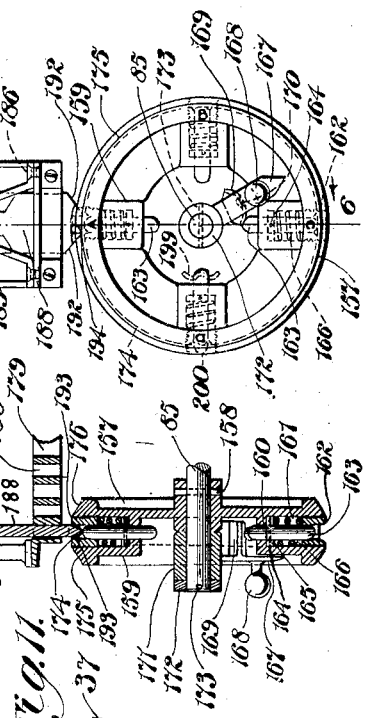
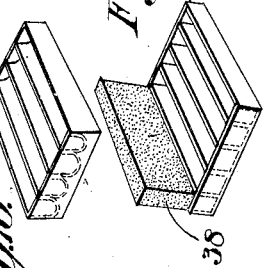
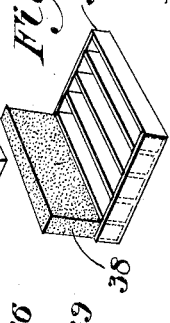
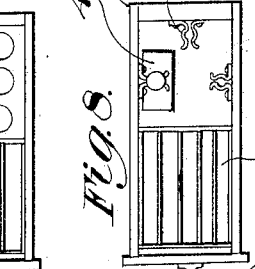
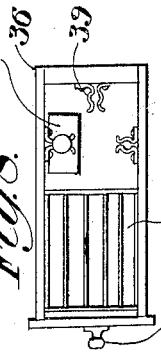
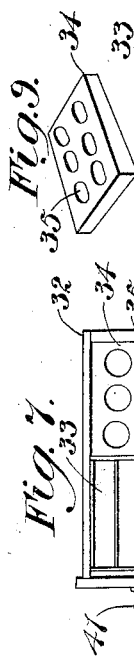
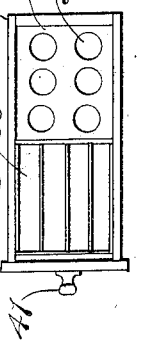
Inventor:
William H. Niemeyer
by John W. Darley,
Atty.

W. H. NIEMEYER.
STAMP RACK.
APPLICATION FILED JAN. 7, 1918.

1,361,539.

Patented Dec. 7, 1920.
5 SHEETS—SHEET 5.

INVENTOR
William H. Niemeyer
BY
John W. Darley.
ATTORNEY

UNITED STATES PATENT OFFICE.

WILLIAM H. NIEMEYER, OF BALTIMORE COUNTY, MARYLAND.

STAMP-RACK.

1,361,539.

Specification of Letters Patent.   Patented Dec. 7, 1920.

Application filed January 7, 1918. Serial No. 210,688.

*To all whom it may concern:*

Be it known that I, WILLIAM H. NIEMEYER, a citizen of the United States, residing in the county of Baltimore and State of Maryland, have invented certain new and useful Improvements in Stamp-Racks, (Case F;) and I do hereby declare the following to be a full, clear, and exact description of the invention, such as will enable others skilled in the art to which it appertains to make and use the same.

My invention relates to stamp racks.

One object of my invention is to provide a rack capable of supporting a plurality of stamps and combined with a hand-operated stopping mechanism and a visual index so that any one of said plurality of stamps can be readily selected for use.

Another object of my invention is to provide a case for said rack so that the rack can be completely closed when not in use, to prevent the accumulation of dust upon the stamps and co-acting mechanism.

Another object of my invention is to provide a stamp pad so located that it can be used for inking all the stamps, and a table for supporting said stamp pad so arranged with reference to said pad and said stamps that it may be used for supporting the article to be stamped.

Another object of my invention is to provide a case for said stamps provided with a plurality of drawers arranged for holding the inking brushes, ink and extra pads and stamps.

These and further objects of my invention are fully explained in the following specification, reference being had to the accompanying drawings, in which:—

Figure 1 is a front view of my improved stamp rack the paper guide 206 being omitted for the sake of clearness.

Fig. 2 is a view of my improved stamp rack looking in the direction of the arrow 2 in Fig. 1, part of the side 21 being broken away and the metallic stamp guard 111 being in section on a vertical plane passing through the axis of the shaft 67 in Fig. 3 and parallel with the side 20.

Fig. 3 is a view of my improved stamp rack looking in the direction of the arrow 3 in Fig. 1, part of the top being broken away.

Fig. 4 is an enlarged detail view of the indexing mechanism, as shown at the right in Fig. 3.

Fig. 5 is a view of the indexing mechanism shown in Fig. 4 when viewed in the direction of the arrow 5.

Fig. 6 is a section along the line 6—6 in Fig. 5 looking in the direction of the arrows.

Fig. 7 is a plan view of a drawer arranged for the reception of the ink bottles and the inking brushes.

Fig. 8 is a plan view of a drawer arranged for the reception of extra inking pads and extra stamps.

Fig. 9 is a perspective view of the block for holding the ink bottles.

Fig. 10 is a perspective view of the tray for holding the inking brushes.

Fig. 11 is a perspective view of the tray for holding extra stamp pads, one of the pads being shown in place.

Figs. 13 and 14 are details hereinafter referred to.

Figures 1, 12:
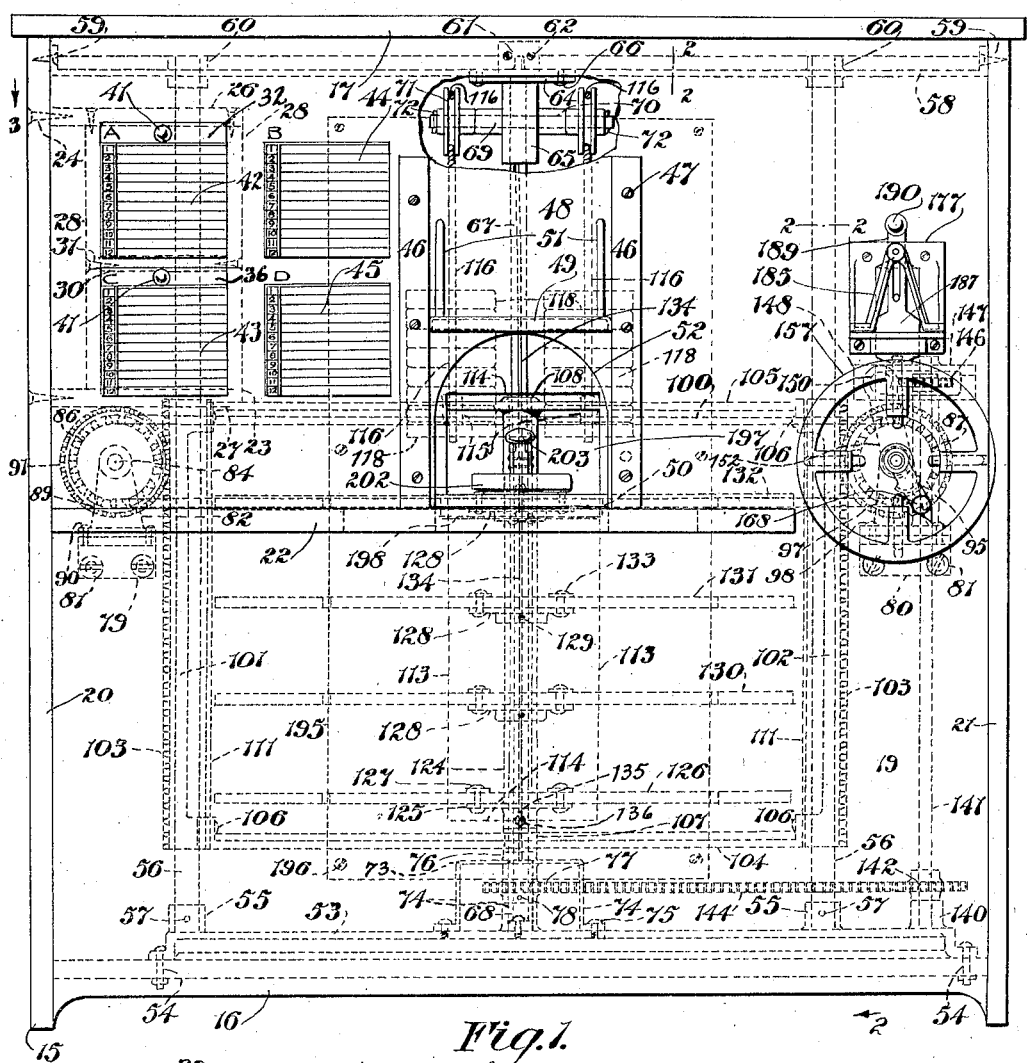
Fig. 12 is a perspective view of the drawer slide.

The casing of my improved stamp rack will first be described.

In the drawings:—

15 represents a casing composed of the bottom 16, the top 17, the back 18, the front 19, the left side 20, the right side 21 and a table 22,—these parts being formed of wood, metal or any suitable composition and joined together in any approved way.

To the left side of the casing the drawer slide 23, (shown in Fig. 12), is secured by means of screws such as 24 which pass through holes provided in said side and enter the holes 25 provided in the top 26 and bottom 27 of the drawer slide. Side pieces 28—28 extend between the top 26 and bottom 27 and are secured thereto by means of screws such as 29. A dividing piece 30 extends between the sides 28—28 midway between the top 26 and bottom 27 and is secured to said sides by means of screws such as 31.

The drawer 32, shown in plan in Fig. 7, is formed of wood or metal and made of such a size as to slip easily within the space between the top 26 and dividing piece 30 of the drawer slide 23. Said drawer is provided with the tray 33, preferably formed of metal, and shaped as shown in Fig. 10, for the reception of the inking bushes. The drawer 32 is provided with the block 34, shown in Fig. 9, which is provided with a plurality of holes such as 35 for the reception of ink bottles.

The drawer 36, shown in plan in Fig. 8, is formed of wood or metal and made of such size as to slip easily within the space between the bottom 27 and dividing piece 30 of the drawer slide 23. Said drawer is provided with the tray 37 preferably formed of metal and shaped as shown in Fig. 11 for the reception of extra inking pads, one of which is shown in place as at 38. The drawer 36 is also provided with a plurality of spring clips 39 secured to the sides and ends thereof for the reception of extra stamps, one of which is shown in place as at 40. The drawers 32 and 36 are provided with knobs 41—41 on the front thereof.

On the front of the drawer 32 there is provided an index 42 consisting of a plurality of horizontal lines numbered *seriatim* from 1 to 12 inclusive, each numeral preferably being placed at the left hand end of the corresponding line. The column of numerals on the drawer 32 is designated by the literal A placed at the top thereof. A similar index 43 is placed upon the front of the drawer 36 and the column of numerals on said index is designated by the literal C placed at the top thereof. Indices 44 and 45 are placed upon the front 19 in the locations shown in Fig. 1, said indices being similar to those placed upon the front of the drawers 32 and 36, excepting that the column of figures on the index 44 is designated by the literal B placed at the top thereof and the column of figures upon the index 45 is designated by the literal D placed at the top thereof.

Metallic cover slides 46—46 are secured to the front 19 by screws such as 47 and the stamp cover 48 slides freely in said slides. The stamp cover 48 is provided with a box-like portion 49 for covering the stamp pad 50 and strengthening ribs such as 51 are provided between the cover 48 and the box-like portion 49. The stamp pad 50 is let into a recess provided within the table 22 so that it may be removed therefrom when desired.

The front 19 is provided with an arch-shaped hole 52 in order to provide access to the stamps, as hereinafter explained.

The interior frame-work of my improved stamp rack will now be described:

The frame base 53 is secured to the bottom 16 by bolts such as 54. The base 53 is provided with two bosses 55—55 formed integrally therewith and provided with central cylindrical holes in which the lower ends of the cylindrical rods 56—56 fit snugly, the latter being secured in said bosses by means of pins such as 57. The frame top 58 extends between the sides 20 and 21 and is secured thereto by screws such as 59.

Figure 2:
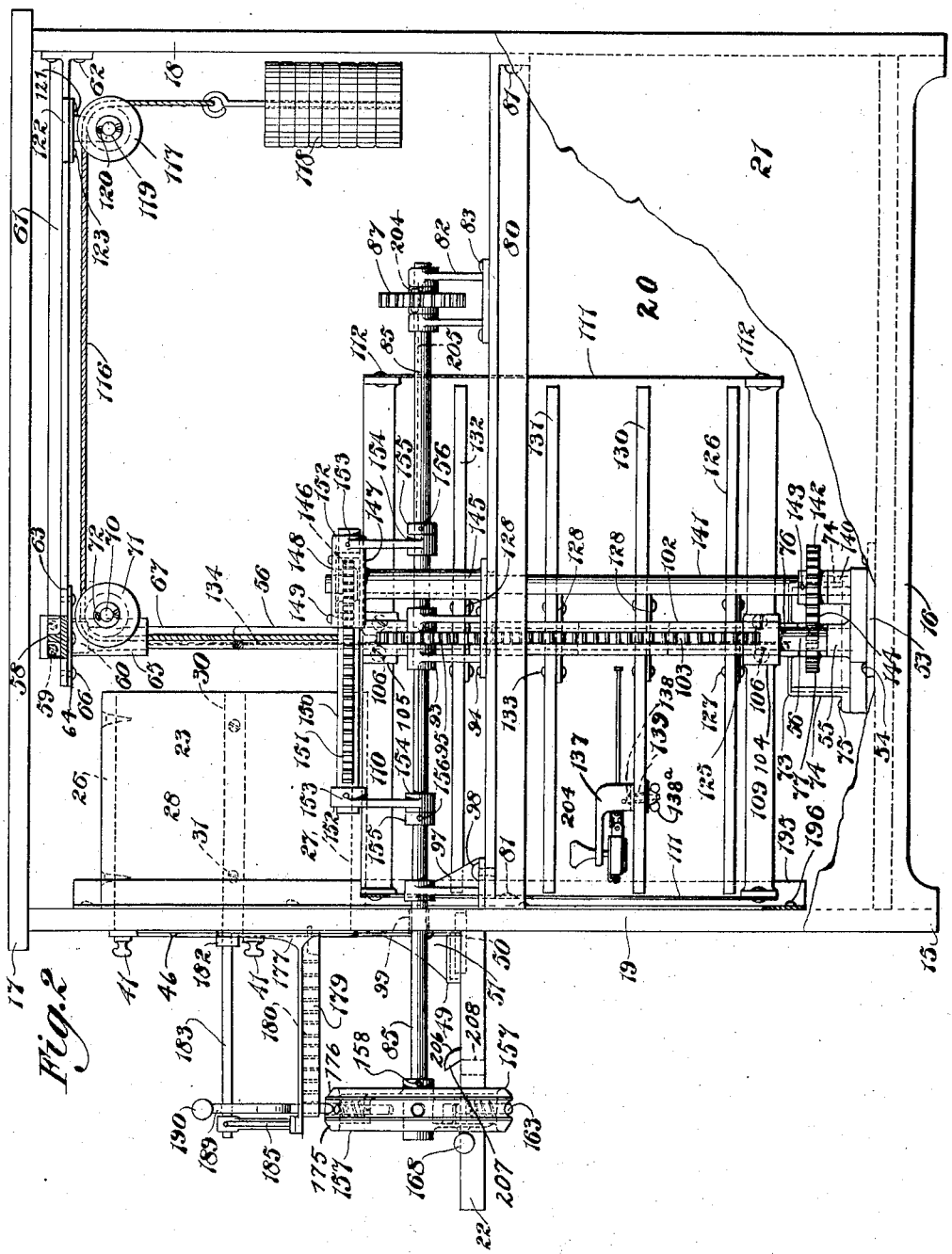

In Fig. 2 the right hand rod 56 is shown as if it were broken away as at 2—2 in Fig. 1 and the frame top 58 is shown as if it were cut away along the line 2—2 in Fig. 1. The frame top 58 is provided with a pair of bosses 60—60 which are in line with the bosses 55—55 of the frame base 53. The bosses 60—60 are provided with central cylindrical holes in which the upper ends of the rods 56—56 fit tightly. The brace 61 is formed integrally with the frame top 58 and the rear end of said brace is secured to the back 18 by means of screws such as 62. A circular portion 63 is provided where the brace 61 joins the frame top 58 and the circular base 64 of the bearing bracket 65 is secured thereto by means of screws such as 66. The bearing bracket 65 is provided with a central cylindrical hole in which is revolubly mounted the upper end of the vertical shaft 67. The lower end of the shaft 67 is revolubly mounted in the boss 68, formed integrally with the frame base 53. A boss 69 is formed integrally with the bearing bracket 65, said boss being on the rear side of said bracket and at right angles thereto. The boss 69 is provided with a central cylindrical hole in which the shaft 70 fits tightly, said shaft extending on each side beyond said boss and pulleys 71—71 are mounted on the projecting ends of said shaft, the pulleys being kept in place thereon by cotter pins such as 72. The bracket 73 is provided with four arms 74—74—74—74, said arms being secured to the frame base 53 by screws such as 75. The boss 76 is formed integrally with the arms 74 and said boss is provided with a central cylindrical hole in which the vertical shaft 67 freely revolves.

The sprocket wheel 77 fits tightly upon the vertical shaft 67 and is secured thereto by means of the pin 78. It is to be noted that the shoulders of the sprocket wheel 77 fit loosely between the top of the boss 68 and the bottom of the boss 76 and hence, vertical motion of the shaft 67 is prevented. Side frames 79 and 80 are provided just inside of the sides 20 and 21 respectively and said side frames extend between the front 19 and back 18 and are secured thereto by screws such as 81.

Bearing brackets 82—82 are secured to the side frames 79 and 80 by screws such as 83. The left hand bearing bracket 82 supports one end of the shaft 84 and the right hand bearing bracket 82 supports one end of the shaft 85 and upon said shafts and between the ears of the bearing brackets 82—82 there are mounted the sprocket wheels 86 and 87 the former of which is secured to the shaft 84 by the pin 88. The pin 204 mounted in the wheel 87 slides freely in the key-way 205 of shaft 85. The shaft 84 extends toward the front and its front end is revolubly mounted in holes provided in the upper ends of the ears of the bearing bracket 89, the latter being secured to the side frame 79 by screws such as 90. A spur gear 91 is mounted upon said shaft between said ears and is secured to said shaft by means of a pin 92. The shaft 85 extends toward the front and near the middle of said shaft it is revolubly mounted in holes provided in the upper ends of the ears of the bearing bracket 93, the latter being secured to the side frame 80 by screws such as 94. A spur gear 95 is mounted upon said shaft between said ears and the pin 96 mounted in the gear 95 slides freely in the key-way 205 of the shaft 85. The front end of the shaft 85 is revolubly mounted in a hole provided in the upper end of the bearing bracket 97 and the latter is secured to the frame 80 by means of screws such as 98. The shaft 85 extends through the hole 99 in the front 19 to the outside of the casing 15. The sprocket chain 100 serves to transmit motion from the sprocket wheel 87 to the sprocket wheel 86.

The construction of the shelves for supporting the stamps and the means for movably supporting said shelves will now be described:—

The sleeves 101 and 102 are provided with holes in the ends thereof by means of which said sleeves are slidably mounted upon the rods 56—56 and to each sleeve there is rigidly secured a rack 103, or said rack may be formed integrally with said sleeve. The teeth of the racks 103—103 mesh with the spur gears 91 and 95. The metallic stamp guard 111 fits between the sleeves 101 and 102, and the bottom spider 104 and the top spider 105 have two of their arms fitting snugly in the interior of the guard 111 and said arms and the stamp guard 111 are secured to said sleeves by means of screws such as 106. The spiders 104 and 105 are provided with bosses 107 and 108 respectively having central cylindrical holes which are a sliding fit upon the vertical shaft 67. The arms 109 and 110 of the spiders 104 and 105 respectively extend at right angles to the arms just described and to their upper ends is secured the stamp guard 111 by means of screws such as 112. The stamp guard 111 is cylindrical in shape and a rectangular hole defined by the vertical bounding lines 113—113 and the horizontal bounding lines 114—114 is formed in said guard in order to provide access to the stamps, as hereinafter explained.

The top spider 105 is provided with bosses 115—115 in each of which is secured one end of the wire ropes 116—116. Said ropes pass upwardly and over the pulleys 71—71 thence rearwardly and over the pulleys 117—117, thence downwardly and to the lower end of each is secured a counter-balance weight 118.

The pulleys 117—117 are revolubly mounted upon the shaft 119 and are kept in place thereon by cotter pins such as 120—120. Said shaft is rigidly supported in the bearing bracket 121 and the latter is secured to the circular enlargement 122 of the brace 61 by means of screws such as 123.

Between the spiders 104 and 105 there is mounted an arbor 124. Said arbor is formed integrally with the flange 125. To the flange 125 there is secured the stamp shelf 126 by means of screws such as 127. Above the shelf 126 a plurality of flanges 128—128—128 is secured by means of screws such as 129 and shelves 130, 131 and 132 are secured to said flanges by means of screws such as 133.

The shelves 126, 130, 131 and 132 are preferably composed of wood and they are formed circular in shape and of such a diameter as to provide ample clearance between their peripheries and the inside surface of the stamp guard 111. The arbor 124 is provided with a central cylindrical hole by means of which it is slidably mounted upon the vertical shaft 67 and said shaft between the bottom of the bearing bracket 65 and the top of the boss 76 is provided with a key-way 134 in which slides the spline 135, the latter being secured to the arbor 124 by means of a screw 136. Stamp brackets such as 137 are secured upon each of the shelves 126, 130, 131 and 132 by means of screws such as 138. The screws 138 pass through slots 139 formed in the shelves and said slots are preferably formed arch-shaped concentric with the axis of the shaft 67, said slots being shown at 139 in Fig. 3. Wing nuts such as 138ª threaded upon the screws 138, secure the stamp brackets 137 in position.

The shelves 126, 130, 131 and 132 are each provided with twelve slots each similar to 139. Each of said shelves corresponds to one of the literals A, B, C or D shown upon the front 19 in Fig. 1 and each slot of each shelf corresponds to one of the numerals under the literal designating that shelf. Thus, the shelf 126 is designated by the literal D, 130 by C, 131 by B and 132 by A, and any slot upon the shelf 126 corresponds to one of the numerals under the literal D upon the index 45 and so for the other shelves and indices.

The means for selecting and moving each stamp into position for operation will now be described.

A boss 140 is formed integrally with the frame base 53 and the lower end of the shaft 141 is revolubly mounted in a central cylindrical hole provided therein. Just above the boss 140 a sprocket wheel 142 is mounted upon the shaft 141 and secured thereto by means of the pin 143. A sprocket chain 144 serves to transmit motion from the sprocket wheel 142 to the sprocket wheel 77. The upper end of the shaft 141 is revolubly mounted in a central cylindrical hole provided in the bearing boss 145, the latter being formed integrally with the bearing bracket 93, and the spur gear 146 is secured near the upper end of the shaft 141. The gear housing 147 is formed integrally with the upper end of the bearing boss 145 in order to provide a guard around the gear 146 and a cap 148 is secured to the housing 147 by means of screws such as 149.

The housing 147 and the cap 148 extend toward the left and they are provided with a cylindrical hole parallel with the shaft 85 in which is slidably mounted the cylindrical rod 150 provided with the rack teeth 151. The teeth 151 mesh with the teeth of the spur gear 146. Arms 152—152 are secured to the rod 150 by means of pins 153—153, said arms extending downwardly and having bosses 154—154 on their lower ends provided with central cylindrical holes in which is revolubly mounted the shaft 85. In order to insure that the rod 150 will have the same linear movement as the shaft 85 the collars 155—155 are secured to said shaft by means of pins 156—156, the opposing faces of said collars fitting closely against the outside faces of the bosses 154—154.

The hand wheel 157 is secured to the front end of the shaft 85 by means of the pin 158. Said hand wheel is provided with four bosses such as 159, there being one boss for each of the shelves 126, 130, 131 and 132. The bosses 159 extend from the rim of the wheel 157 to some distance from the center of the shaft 85, as shown in Figs. 5 and 6. Each boss is provided with a small cylindrical hole 160 and a larger cylindrical hole 161, the outer end of the latter being threaded for the reception of the threaded thimble 162, and said thimble is provided with a central cylindrical hole of the same size as and in line with the hole 160. In each boss there is mounted an index pin 163 which slides freely in the hole 160 and the hole in the thimble 162. Said pin is provided with a cross pin 164 against which rests the washer 165, and the compression spring 166 bearing against said washer and the inside face of the thimble 162 serves to keep the pin 163 in the position shown in Figs. 5 and 6.

The index pointer 167 is formed integrally with the index handle 168, the index cam 169, the latter being provided with a central depression 170, and the boss 171, the latter being provided with a central cylindrical hole by means of which said boss is revolubly mounted upon the shaft 85. A collar 172 secured to the shaft 85 by means of the pin 173 serves to prevent displacement of the boss 171. The hand wheel 157 is provided with the groove 174, a front chamfer 175 and a rear chamfer 176 for a purpose hereinafter described. The index stop bracket 177 is secured to the front 19 by means of screws such as 178. Said bracket is provided with a horizontal portion 179 provided with a plurality of rectangular index holes such as 180, there being one hole corresponding to each of the twelve horizontal lines of each of the indices 42—43—44 and 45 and each of said holes being designated by one of the numerals from 1 to 12, inclusive, as at 181 in Fig. 4. The bracket 177 is provided with a boss 182 in which the index stop guide rod 183 is secured by means of the pin 184. The outer end of said rod is supported by the bracket 185, the latter being secured to the bracket 177 by means of screws such as 186. The index stop 187, (see Fig. 5), is provided with a flat portion 188 of such a width and thickness that it will slide freely in the holes 180. The flat portion 188 is formed integrally with the handle 189 and knob 190. The handle 189 is provided with a slot 191 in which the guide rod 183 fits loosely. The flat portion 188 is chamfered as at 192—192 and as at 193—193 for purposes hereinafter explained. It is also provided with the index slot 194.

As shown in Fig. 5, the hand wheel 157 is provided on its front face with the literals A, B, C and D, each one located in line with the axis of one of the bosses 159.

In order to insure that only the selected stamp can be reached by the hand, the hand guard 195 is secured to the front 19 by means of screws such as 196, said guard being provided with a rectangular hold 197, the top of which is in line with the upper horizontal line 114, the sides of which are in line with the vertical lines 113—113 and the bottom of which lies along the horizontal line 198.

Figure 15:
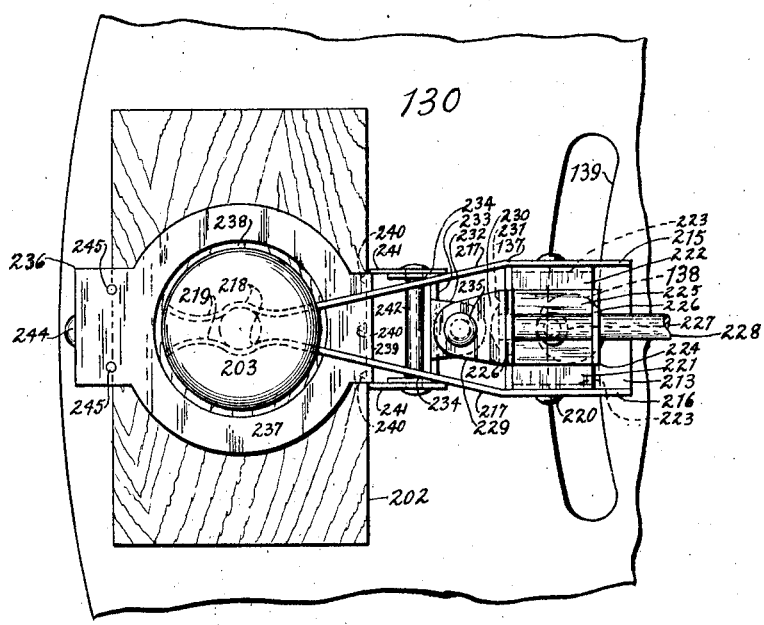
Figs. 15 and 16 are enlarged views of the stamp bracket and coöperating parts.
Figure 16:
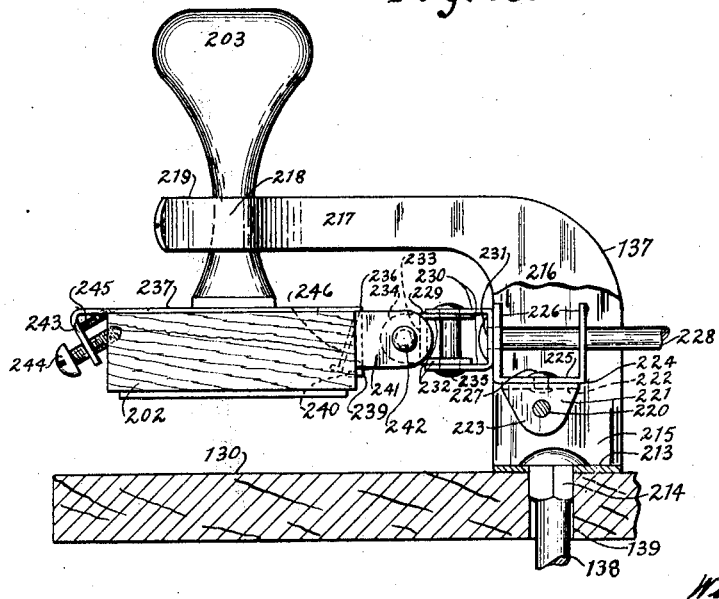

My improved stamp bracket and cooperating parts shown in Figs. 15 and 16 consist of the stamp bracket 137, which comprises the flat base 213 provided with a square hole in which fits snugly the square shank 214 of the screw 138. The shank 214 slides freely in the slot 139 and serves to locate the stamp bracket 137 in position. Formed integrally with the base 213 are the vertical sides 215 and 216, the latter being broken away to show some of the other parts. Formed integrally with the vertical sides 215 and 216 are the angularly disposed spring portions 217—217, the front end of each of which is provided with a curved portion 218, the latter being shaped to embrace the neck of the stamp handle 203. The outwardly curved portions 219—219 are formed integrally with the curved portions 218 for a purpose hereinafter explained. A supporting pin 220 is secured in the vertical sides 215 and 216 and the guide support 221, which comprises the flat base 222 and the ears 223—223, is revolubly mounted upon said pin. The outer surfaces of the ears 223—223 fit loosely between the inner surfaces of the vertical sides 215 and 216. The guide 224 comprises the flat base 225 and the ears 226—226. The base 225 rests upon the base 222 and is articulated therewith by means of the pin 227.

The ears 226—226 are provided with holes in which is slidably mounted the guide rod 228. The universal joint 229 comprises a member having the ears 230—230 formed integrally with the base 231, the latter being riveted to the front end of the guide rod 228. The universal joint 229 also comprises a member having the ears 232—232 formed integrally with the base 233 and the ears 234—234. The ears 230—230 and 232—232 are provided with holes through which loosely passes the pin 235. The stamp clamp 236 is provided with a circular portion 237 having the hole 238, the latter being of such a size as to freely pass over the enlarged head of the stamp handle 203.

Formed integrally with the inner side of the circular portion 237 is a depending flange 239, the lower edge of which is provided with three outwardly extending points 240. The flange 239 is formed integrally with two inwardly extending ears 241—241, the inner surfaces of which loosely embrace the outer surfaces of the ears 234—234. The ears 234—234 and 241—241 are provided with holes through which loosely passes the pin 242. Formed integrally with the outer side of the circular portion 237 is an angularly disposed flange 243 provided with a threaded hole in which is screwed the set screw 244.

In order to prevent the flange 243 from being bent outwardly from the position shown in Fig. 16, the stay screws 245—245 are screwed in threaded holes provided in said flange and in the circular portion 237 and are afterward soldered, riveted or otherwise secured in place. In order to provide for sufficient pressure between the flange 239 and the stamp 202 when the latter is secured in place, the stamp clamp 233 is made with the flange 239 bent as shown dotted as at 246.

When the stamp 202 is to be secured in place, which is usually done by the purchaser of my improved stamp rack, the stamp clamp 237 is pulled forwardly so that it will pass from underneath the spring portions 217—217, the screw 244 is then to be unscrewed and the stamp handle 203 to be passed through the hole 238 so that the upper surface of the stamp 202 rests against the under surface of the flat portion 237, the screw 244 is then to be screwed in, and as the point thereof moves inwardly it will press the inner edge of the stamp 202 against the sharp points 240 and move the flange 239 from the position shown dotted in Fig. 16 to the position shown by full lines, and at the same time, the points 240 will press into the wood composing the stamp 202. The point of the screw 244 will also press into said wood and thus the stamp 202 is clamped between the flange 239 and the screw 244 with the point of the latter and the points 240 embedded in the wood so as to prevent displacement of the latter from the clamp 236.

The operation of my improved stamp rack is as follows:—

By an inspection of the indices 42, 43, 44 and 45 the operator ascertains the horizontal line upon which the stamp he desires to use is indexed. He then notes the numeral at the left of said horizontal line and the literal at the head of the column of numerals including said numeral. The operator then grasps the index handle 168 and moves it until the index pointer 167 points to the same literal on the wheel 157 as that at the head of said column of numerals. During this motion of the handle 168, the cam 169 presses the index pins 163 outwardly against the pressure of the spring 166, and when the pointer 167 is opposite a literal, the point of the pin 163 is resting in the control depression 170, as shown dotted at 199 in Fig. 5. When the handle 168 is moved from the position shown in Fig. 5 to the position in which the cam 169 occupies the position shown dotted at 199 in said figure, the pointer 167 will be opposite the literal D and the corresponding pin 163 will be moved outwardly into the position shown dotted at 200 in said figure.

It is to be understood that the literal A on the index 42 refers to the shelf 132, the literal B on the index 44 refers to the shelf 131, the literal C upon the index 43 refers to the shelf 130 and the literal D upon the index 45 refers to the shelf 126.

The setting of the pointer 167, as just described, will set the index mechanism so that when the hand wheel 157 is revolved, as hereinafter explained, the proper shelf, in this instance the shelf 126, will be moved to the position occupied by the shelf 132 in Figs. 1 and 2. The operator then grasps the knob 190 forming part of the index stop 187, (see Figs. 3, 5 and 6) moves it upwardly, until the flat portion 188 is entirely clear of that one of the index holes 180 in which it may be resting, the knob 190 is then moved either forwardly or rearwardly until its lower end is over that one of the holes 180 which corresponds to that one of the numerals 201, (see Fig. 3) that is the same as the numeral at the left of the horizontal line upon which the stamp the operator desires to use is indexed. The operator then moves the knob 190 downwardly and introduces the lower end of the flat portion 188 into said hole and then the index stop 187 will be in the position shown in Fig. 5, further downward motion of said stop being prevented by the top of the slot 191 resting against the index stop guide rod 183. It is to be noted that the bottom of the flat portion 188 is chamfered as at 192—192 and 193—193 for the purpose of easy introduction within the holes 180 and also for another purpose hereinafter explained.

The setting of the index stop 187, as just described, will set the index mechanism so that when the hand wheel 157 is moved in the direction of the axis of the shaft 85, the shelves will be revolved so that the desired stamp will be presented at the front of the casing ready for operation in the position shown as occupied by the stamp 202 in Figs. 1 and 3.

The setting of the index mechanisms having been performed the operator grasps the rim of the hand wheel 157 and moves it either backwardly or forwardly toward the index stop 187. When the hand wheel 157 is moved, the rack teeth 151 are also moved in unison therewith. The motion of the rack teeth 151 revolves the spur gear 146 and the sprocket wheel 142. The motion of the sprocket wheel 142 is transmitted by the sprocket chain 144 to the sprocket wheel 77 and the latter being secured to the shaft 67 will revolve same. Since the spline 135 is secured to the arbor 124 and fits within the key-way 134, it is evident that the shelves 126, 130, 131 and 132 will be revolved together.

During said motion of the hand wheel 157 one of the chamfers 175 or 176 will contact with one of the chamfers 193 and move the index stop 197 upwardly and then further motion of the hand wheel 157 will bring the groove 174 immediately beneath the lower end of the index stop 187 and the weight of said stop will cause the introduction of said end within said groove, thus preventing further motion in said direction.

The operator then turns the rim of the hand wheel 157 in either direction. The revolution of the hand wheel 157 will revolve the spur gear 95 and through the intermediary of the sprocket wheel 87, the sprocket chain 100 and sprocket wheel 86 the spur gear 91 will be revolved in unison with the spur gear 95. Since said gears mesh with the racks 103—103 and since the key-way 134 is sufficiently long to permit the spline 135 to slide therein, it is evident that the shelves 126, 130, 131 and 132 will be either elevated or depressed.

During said movement, the point of the pin 163 projecting as at 200 will contact with one of the chamfers 192 or 193 and raise the index stop 187 slightly until the end of said pin has come into alinement with the slot 194 and then the stop 187 will fall and said slot will embrace said pin. Thus it will be noted that the hand wheel 157 has been moved to bring the proper stamp to the front of the stamp rack and then said hand wheel has been revolved in order to elevate or depressed the shelf upon which said stamp is mounted so that said stamp is finally brought into the position occupied by the stamp 202 in Figs 1 and 3.

It is also to be noted that the weights 118—118 are made of such a weight as to approximately counterbalance the weight of the stamp shelves and the parts that move upwardly and downwardly therewith.

The operator then grasps the braces 51 and raises the box-like portion 49 of the stamp cover 48 from the position shown in Fig. 2 to the position shown in Fig. 1, thus providing access to the interior of the stamp case.

The operator then grasps the handle 203 of the stamp 202, pulls said handle toward him, presses said stamp upon the stamp pad 50, then pulls it forwardly and stamps the article resting upon the table 22.

It is to be noted that during the early part of said movement of the handle 203, the latter will move outwardly from the curved portions 218—218, said portions springing apart to permit said movement. As the handle 203 is moved outwardly, the guide rod 228 slides within the ears 226 and due to the fact that the latter is articulated with the guide support 221 by means of the pin 227 and that said support revolves upon the pin 220, the front end of the guide rod 228 can be moved upwardly, downwardly or sidewise in either direction. When the stamp 202 is located over the object to be stamped, by reason of the fact that the stamp clamp 236 is joined to the front end of the guide rod 228 by the universal joint 229, it is evident that the stamp 202 may be moved in any desired direction to enable the stamping surface of the stamp to conform to the object to be stamped or to obtain parallelism with any reading matter or guiding lines upon said object.

When the article has been stamped, the operator pushes the handle 203 backwardly between the outwardly curved portions 219, said portions spring outwardly and allow the stamp handle to pass between the curved portions 218, and then the latter spring inwardly and support the stamp 202 in the position shown in Fig. 16 with its stamping surface out of contact with any portion of my improved stamp rack.

When it is desired to stamp with a different colored ink, the operator removes the stamp pad 50, places it in the tray 37 and removes the appropriate stamp pad therefrom and places it in the position occupied by the stamp 50 in Figs. 1 and 2.

In order to insure that the stamp will not touch the reading matter that may be on the paper that is to be stamped, the paper guide 206 is secured to the table 22, the front face of said guide being angularly disposed as at 207. A slot 208 is provided through the table 22, said slot being of the same length as the rib 206 and the rear side of said slot meeting the angular face 207. Thus it is evident that as papers are pushed rearwardly to be located for stamping, the rear edge of said papers will strike the angularly disposed face 207 and be guided down through the slot 208, thus removing same from any danger of contact with the stamp.

While I have shown but one embodiment of my invention, it is to be understood that many modifications may be made therein without departing from the spirit thereof.

I claim:—

1. In a stamp rack, the combination with a frame and a plurality of stamp shelves, of means for rotating said shelves and means for moving said shelves in the direction of the axis of rotation.

2. In a stamp rack, the combination with a frame and a plurality of stamp shelves, of means for rotating said shelves, means for moving said shelves in the direction of the axis of rotation and hand operated indexing mechanism for terminating the rotation and motion of said stamps.

3. In a stamp rack, the combination with a frame, of a shaft revolubly supported thereby, a key-way in said shaft, an arbor slidably mounted upon said shaft, a spline secured to said arbor and sliding in said key-way, stamp shelves supported by said arbor, means for revolving said shaft and means for moving said arbor along said shaft.

4. In a stamp rack, the combination with a frame, of a shaft revolubly supported thereby, a key-way in said shaft, an arbor slidably mounted upon said shaft, a spline secured to said arbor and sliding in said key-way, stamp shelves supported by said arbor, spiders slidably mounted upon said shaft and forming shoulder bearings for said arbor, rods supported by said frame, sleeves slidably mounted upon said rods and secured to said spiders, means for revolving said shaft and means for moving said sleeves.

5. In a stamp rack, the combination with a frame, of a shaft revolubly supported thereby, a key-way in said shaft, an arbor slidably mounted upon said shaft, a spline secured to said arbor and sliding in said key-way, stamp shelves supported by said arbor, spiders slidably mounted upon said shaft and forming shoulder bearing for said arbor, rods supported by said frame, sleeves slidably mounted upon said rods and secured to said spiders, means for revolving said shaft, means for moving said sleeves and a counterbalance for said sleeves and the parts moved thereby.

6. In a stamp rack, the combination with a frame, of a shaft revolubly supported thereby, a key-way in said shaft, an arbor slidably mounted upon said shaft, a spline secured to said arbor and sliding in said key-way, stamp shelves supported by said arbor, spiders slidably mounted upon said shaft and forming shoulder bearings for said arbor, rods supported by said frame, sleeves slidably mounted upon said rods and secured to said spiders, racks upon said sleeves, gears meshing with said rack and a hand wheel for revolving said gears and shaft.

7. In a stamp rack, the combination with a frame, of a shaft revolubly supported thereby, stamp shelves revolved by said shaft, a sprocket wheel on said shaft, a spur gear and a sprocket wheel rigidly secured together and revolubly supported on said frame, a sprocket chain connecting said sprocket wheels, a rack slidably supported by said frame and meshing with said gear and a hand wheel for moving said rack.

8. In a stamp rack, the combination with a frame, of rods supported thereby, sleeves sliding upon said rods, spiders secured to said sleeves, an arbor mounted between said spiders, stamp shelves secured to said arbor, racks upon said sleeves, gears meshing with said racks and a hand wheel for rotating said gears.

9. In a stamp rack, the combination with a revolving arbor, and stamp shelves supported thereby, of spiders shiftably supporting the ends of said arbor, and a stamp guard provided with an opening secured to said spiders and moving therewith.

10. In a stamp rack, the combination with a revolving arbor, and stamp shelves supported thereby, of spiders mounted adjacent to the ends of said arbor, a stamp guard provided with an opening secured to said spiders, means for moving said arbor axially and a hand guard provided with a hole located in front of said opening.

11. In a stamp rack, the combination with a revolubly mounted hand wheel provided with a radially disposed index pin, of a spring for pressing said pin inwardly, a cam for pressing said pin outwardly, and an index stop provided with a slot for receiving said pin to terminate the revolution of said wheel.

12. In a stamp rack, the combination with a slidably mounted hand wheel provided with a peripheral slot, of an index stop for entering said slot to terminate the sliding motion of said wheel.

13. In a stamp rack, the combination with a revolubly and slidably mounted hand wheel provided with a radially disposed index pin and a peripheral groove, of a spring for pressing said pin inwardly, a cam for pressing said pin outwardly, and an index stop for entering said groove to terminate the sliding motion of said wheel and provided with a slot for receiving said pin to terminate the revolution of said wheel.

14. In a stamp rack, the combination with a casing, of a hand wheel slidably supported thereby, a bracket supported by said casing and provided with a plurality of holes, an index stop adjustably supported by said bracket for introduction into any of said holes and a groove in said wheel for the reception of said stop.

15. In a stamp rack, the combination with a frame, a stamp shelf supported in said frame and means for moving said shelf transversely, of a guard having an opening and moving with said shelf and a fixed guard adjacent to said opening.

16. In a stamp rack, the combination with a stamp bracket, of a guide support pivotally mounted upon said bracket, a guide pivotally mounted upon said support, a guide rod slidably mounted in said guide and a stamp attached to the front end of said rod.

17. In a stamp rack, the combination with a stamp bracket, of a guide support pivotally mounted upon said bracket, a guide pivotally mounted upon said support, a guide rod slidably mounted in said guide, a stamp, and a universal joint having one end secured to the front end of said guide rod and the other end secured to said stamp.

18. In a stamp rack, the combination with a stamp bracket, of a guide support pivotally mounted upon said bracket, a guide pivotally mounted upon said support, a guide rod slidably mounted in said guide, a stamp, a clamp secured to said stamp and a universal joint having one end rigidly secured to the front end of said rod and the other end pivotally secured to said clamp.

19. In a stamp rack, the combination with a stamp including a handle, of a clamp for said stamp comprising a flat portion having a hole for the passage of said handle, a flange provided with points for embracing one side of said stamp and another flange provided with a screw for clamping the opposite of said stamp.

20. In a stamp rack, a stamp clamp comprising a flat portion provided with a hole, a flange formed integrally with said flat portion and terminating in a plurality of points, an angularly disposed flange formed integrally with said flat portion, threaded holes in said flat portion and said angularly disposed flange, tie screws threaded in said holes and extending between said flat portion and angularly disposed flange and a clamping screw threaded in said angularly disposed flange.

In testimony whereof I affix my signature.

WILLIAM H. NIEMEYER.